July 28, 1925.
W. D. PALMER
CONDIMENT HOLDER
Filed Feb. 2, 1924
1,547,953
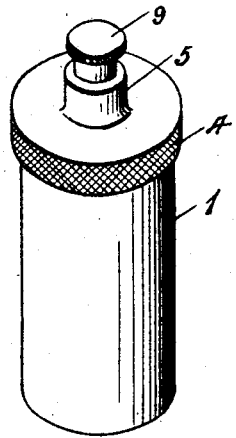
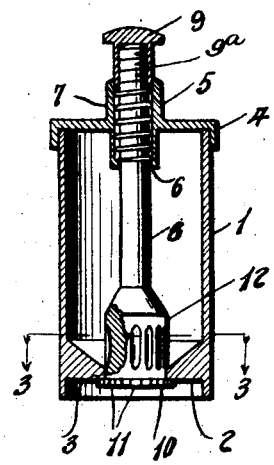
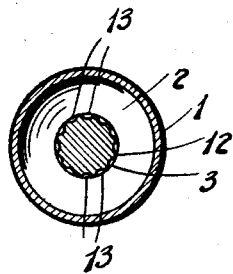
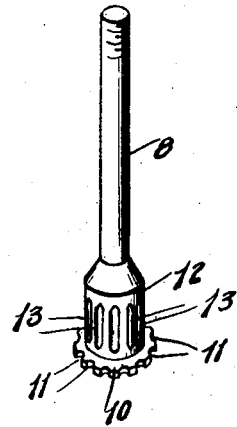
Inventor
W. D. Palmer,
By
Attorney Patented July 28, 1925.

1,547,953

UNITED STATES PATENT OFFICE.

WILLARD D. PALMER, OF NEW LONDON, CONNECTICUT.

CONDIMENT HOLDER.

Application filed February 2, 1924. Serial No. 690,166.

*To all whom it may concern:*

Be it known that I, WILLARD D. PALMER, a citizen of the United States, residing at New London, in the county of New London and State of Connecticut, have invented certain new and useful Improvements in Condiment Holders; and I do hereby declare the following to be a full, clear, and exact description of the invention, such as will enable others skilled in the art to which it appertains to make and use the same.

The invention relates to a container designed most especially for table use to hold a seasoning for food, such as salt, and has for its object to insure a positive feed of the salt and to prevent the same from banking in the holder so as not to feed when required for use.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a perspective view of a condiment holder embodying the invention,

Figure 2 is a vertical central sectional view, the plunger being in full lines,

Figure 3 is a horizontal section on the line 3—3 of Figure 2, and

Figure 4 is a perspective view of the plunger.

Corresponding and like parts are referred to in the following description and designated in the several views of the drawings by like reference characters.

The numeral 1 designates a receptacle which forms the body of the holder and which contains the salt for use at table. The bottom 2 of the receptacle 1 is slightly elevated and is formed with a central opening 3 having a smooth wall and its top side inclines from the sides of the receptacle to the opening, whereby to direct the salt thereto. A cover 4 closes the top of the receptacle 1 and is provided centrally with a tubular extension 5 which projects above and below the top of the cover. An inner flange 6 at the lower end of the tubular extension 5 forms a stop shoulder for a helical spring 7 and a guide for a plunger 8. A button 9 is connected to the upper end of the plunger 8 by means of its hollow shank 9ª which has threaded connection with said end of the plunger and which has a close fit within the tubular extension 5. The lower end of the shank 9ª bears upon the upper end of the spring 7. During the application of the button 9 to the plunger 8 the spring 7 is tensioned, and as the result the spring 7 exerts an upward pressure against the plunger 8 and a downward pressure against the cover 4. The lower end of the plunger 8 is provided with a horizontally disposed circular flange 10 which is larger in diameter than the opening 3 and which underlies the bottom 2. The flange 10 is provided in its edge with notches 11, and functions as a spreader for the condiment flowing through the opening 3 and as a stop to limit the upward movement of the plunger 8 under the influence of the spring 7. When the plunger 8 is at the limit of its upward movement, the flange 10 contacts with the under side of the bottom 2. As the plunger 8 is limited in its upward movement with respect to the receptacle 1 by the flange 10, and as the spring 7 is always under tension, the spring 7 will hold the plunger 8 in raised position and the cover 4 in closed position. The plunger 8 is provided immediately above the flange 10 with a cylindrical enlargement 12 which projects into the receptacle 1 through the opening 3 and which has a snug sliding fit in the opening 3. When the plunger 8 is in elevated position, the lower end portion of the enlargement 12 contacts with the wall of the opening 3 and as the result closes said opening against the passage therethrough of the condiment. Above its lower end portion, the enlargement 12 is provided in its side with longitudinally extending grooves 13 which decrease in depth toward opposite ends and vanish into the sides of the enlargement. The grooves 13 are preferably in line with the notches 11 and provide passages for the discharge of the salt when the plunger 8 is depressed by exerting a pressure upon the button 9. The plunger and button are adapted to be rotated so as to agitate the salt and prevent banking thereof and insure a positive feed when the plunger is depressed. The notches 11 provide a ready discharge for the salt as it escapes through the openings formed by the grooves 13 when the plunger is depressed. The raised bottom 2 provides a space thereunder to receive the flanged end 10 of the plunger when the holder is placed upright upon the table. It is to be understood that the device may be made of any suitable material best adapted for the purpose.

What is claimed is:

1. A condiment holder comprising a receptacle provided in its bottom with a discharge opening having a smooth wall, a spring supported plunger within the receptacle provided with a lower end portion of uniform width and having a snug sliding fit in said opening, said end portion of the plunger being provided above said bottom of the receptacle with longitudinally extending grooves, and a horizontally disposed flange secured to the lower end of the plunger and contacting with the lower side of said bottom of the receptacle.

2. A condiment holder comprising a receptacle provided in its bottom with a discharge opening having a smooth wall, a spring supported plunger within the receptacle provided with a lower end portion of uniform width and having a snug sliding fit in said opening, said end portion of the plunger being provided above said bottom of the receptacle with longitudinally extending grooves, and a horizontally disposed flange secured to the lower end of the plunger and contacting with the lower side of said bottom of the receptacle, said flange being provided with notches alining with said grooves.

In testimony whereof I affix my signature in presence of two witnesses.

WILLARD D. PALMER.

Witnesses:
PHILIP H. GOLDSMITH,
DANIEL C. HALLMAN.